United States Patent
Baumgartner et al.

(10) Patent No.: US 6,242,532 B1
(45) Date of Patent: Jun. 5, 2001

(54) POLYMER BLENDS OF OLEFIN ELASTOMERS, SYNDIOTACTIC POLYPROPYLENE AND STYRENE-BUTADIENE-STYRENE COPOLYMERS, METHOD OF BLENDING, PRODUCTS MADE THEREFROM, AND METHOD OF MAKING PRODUCTS

(75) Inventors: Alan S. Baumgartner, Houston; Robert H. Burr, deceased, late of Seabrook, both of TX (US), by Elanda L. Burr, legal representative

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/123,095

(22) Filed: Jul. 27, 1998

Related U.S. Application Data

(63) Continuation of application No. 08/927,623, filed on Sep. 11, 1997, now abandoned, which is a continuation of application No. 08/772,638, filed on Dec. 23, 1996, now abandoned, which is a continuation of application No. 08/667,019, filed on Jun. 20, 1996, now abandoned.

(51) Int. Cl.$^7$ ............................... C08L 9/00; C08L 9/06; C08L 53/02
(52) U.S. Cl. .................. 525/95; 525/97; 525/98
(58) Field of Search ................... 525/95, 97, 98

(56) References Cited

U.S. PATENT DOCUMENTS 4,258,145 * 3/1981 Wright .................................. 525/99

FOREIGN PATENT DOCUMENTS

| 05163394 | * | 6/1993 | (JP) . |
| WO 95/26380 | * | 5/1995 | (WO) . |

OTHER PUBLICATIONS

Asanuma et al, CAPLUS Abstract AN 1991:537577, Abstracting JP 03081356, Jan. 1991.*

* cited by examiner

*Primary Examiner*—Jeffrey Mullis
(74) *Attorney, Agent, or Firm*—Gilbreth & Associates, P.C.; Jim D. Wheelington

(57) ABSTRACT

A blend composition including from about 1 to about 99 weight percent syndiotactic polypropylene (sPP) and from about 99 to about 1 weight percent styrene-butadiene-styrene block copolymer (SBS) and olefin elastomer, based on the weight of the sPP, SBS and olefin elastomer. A method of making the composition includes contacting the sPP, SBS and olefin elastomer at a temperature above the melting point of the sPP and olefin elastomer, with useful articles formed therefrom.

7 Claims, No Drawings

POLYMER BLENDS OF OLEFIN ELASTOMERS, SYNDIOTACTIC POLYPROPYLENE AND STYRENE-BUTADIENE-STYRENE COPOLYMERS, METHOD OF BLENDING, PRODUCTS MADE THEREFROM, AND METHOD OF MAKING PRODUCTS

This application is a continuation of application Ser. No. 08/927,623, filed on Sep. 11, 1997, now abandoned which is a continuation of prior application Ser. No. 08/772,638, filed on Dec. 23, 1996, now abandoned, which was a continuation of application Ser. No. 08/667,019, filed on Jun. 20, 1996, now abandoned.

BACKGROUND OF THE INVENTION

1. Field of the Invention

The present invention relates to polymer blends, to methods of blending, to articles made from the blends, and to methods of making articles. In another aspect, the present invention relates to polymer blends of elastomers, syndiotactic polypropylene and block copolymers, to methods of blending elastomers, syndiotactic polypropylene and block copolymers, to articles made from blends of elastomers, syndiotactic polypropylene and block copolymers, and to methods of making articles from blends of elastomers, syndiotactic polypropylene and block copolymers.

2. Description of the Related Art

Present blend compositions for mechanical rubber goods (MRG) applications utilize blends of elastomers, crystalline polystyrene polymers and styrene-butadiene-styrene block copolymers.

U.S. Pat. No. 4,041,103, issued Aug. 9, 1977 to Davison et al., discloses blends of a block copolymer and a polyamide. Styrene-butadiene-styrene copolymer is listed is as an example of a block copolymer which can be utilized. The '103 patent teaches that best results are obtained when the viscosities of the block copolymer and polyamide are substantially the same at the conditions of temperature and shear used for blending and processing. The '103 patent further teaches that additional resins may be employed in matching viscosities, with isotactic and atactic polypropylenes disclosed as being suitable for use in matching viscosities.

U.S. Pat. No. 4,386,187, issued May 31, 1983 to Grancio et al., discloses a thermoformable polymer blend composition comprising a styrene polymer, a crystalline olefin polymer such as polypropylene, and a block copolymer such as styrene-butadiene-styrene copolymer which acts as a compatibilizer for the olefin and styrene polymers in the blend. The composition may optionally include copolymers of monoolefins with other monoolefins.

U.S. Pat. No. 4,489,034, issued Dec. 18, 1984 to Davison, discloses a thermoforming process using a modified polymer blend. The polymer blend of polyethylene and crystalline isotactic polypropylene is modified by, for example, ethylene/propylene rubber, with the modifier present in the range of about 5 to about 35 weight percent.

U.S. Pat. No. 4,838,939, issued Jun. 13, 1989 to Kanda et al., discloses polymer compositions which are useful in damping sheets for motor vehicles. The composition is discloses as including an organic fibrous filler and a binder component. Examples of the binder component include, rubbers such as styrene butadiene rubber, and synthetic resins such as polypropylene.

U.S. Pat. No. 5,256,226, issued Oct. 26, 1993 to Marzola et al., discloses an adhesive polymer composition for repairing exposed or damaged parts of a plastic coating on metal tubing. The adhesive polymer composition is disclosed as including isotactic polypropylene and styrene-butadiene-styrene block copolymers.

U.S. Pat. No. 5,380,796, issued Jan. 10, 1995 to Campbell et al., discloses compositions of polyphenylene ethers and functionalized olefin polymers such as polyethylene. The composition can include impact modifiers, such as styrene-butadiene-styrene copolymers.

European Patent Application 0 060 524 A2, published Sep. 22, 1982, discloses a thermoplastic rubber consisting of a mixture of polypropylene, high-impact polystyrene and a styrene/diene block copolymer. The polypropylene is an isotactic polypropylene described as having an "isotacticity index of at least 80". The amount of elastomeric styrene/diene block copolymer is disclosed as being between 30 and 90 weight percent.

"Performance/Microstructure Relationship Of Blends Of Asphalts With Two Incompatible Polymers", C. Lenoble, Fuel Science and Technology Int'l, 10(4–6), 549–564 (1992), discloses an asphalt composition also containing an atactic polypropylene and a styrene-butadiene-styrene triblock copolymer. The composition was made by first mixing styrene-butadiene-styrene into asphalt, and then adding atactic polypropylene into the mixture. The atactic polypropylene and the styrene-butadiene-styrene triblock copolymer were observed as being segregated within the asphalt.

"Current Applications Of Styrene Block Copolymer Rubbers", G. Holden, Journal of Elastomers and Plastics, Vol. 14, page 148–154 (July 1982), discloses blends of styrene-butadiene-styrene polymers with polystyrene, polyethylene or polypropylene show improved impact and tear resistance with minimum changes in tensile strength and flexural modulus.

However, in spite of these advancements in the prior art, there is still a need for an improved elastomer, styrene-butadiene-styrene and polypropylene blend composition for use in mechanical rubber goods applications.

This and other needs in the art will become apparent to those of skill in the art upon review of this specification, including its drawings and claims.

SUMMARY OF THE INVENTION

It is an object of the present invention to provide for an improved elastomer, styrene-butadiene-styrene and propylene blend composition for use in mechanical rubber goods applications.

This and other objects of the present invention will become apparent to those of skill in the art upon review of this specification, including its drawings and claims.

According to one embodiment of the present invention, there is provided a composition comprising in the range of about 1 to about 99 weight percent syndiotactic polypropylene, and in the range of about 99 to about 1 weight percent styrene-butadiene-styrene copolymer and olefin elastomer, based on the weight of the syndiotactic polypropylene, styrene-butadiene-styrene copolymer and olefin elastomer.

According to another embodiment of the present invention, there is provided a method of making a polymer blend. The method generally includes contacting together syndiotactic polypropylene, an olefin elastomer, and styrene-butadiene-styrene copolymer, at a temperature that is above the melting point of the syndiotactic polypropylene and the olefin elastomer, but below the point at which any substantial degradation of the elastomer, syndiotactic polypropylene, olefin elastomer or styrene-butadiene-styrene copolymer occurs.

According to even another embodiment of the present invention there is provided a method of forming an article. The method generally includes first contacting together syndiotactic polypropylene, an olefin elastomer, and styrene-butadiene-styrene copolymer, at a temperature that is above the melting point of the syndiotactic polypropylene and olefin elastomer, but below the point at which any substantial degradation of the syndiotactic polypropylene, olefin elastomer, or styrene-butadiene-styrene copolymer occurs, to form a mixture. This mixture is then formed into a desired shape, which is then cooled to below its melting point.

According still another embodiment of the present invention, there is provided an article comprising a formed body comprising in the range of about 1 to about 99 weight percent syndiotactic polypropylene, and about 99 to about 1 weight percent styrene-butadiene-styrene copolymer and olefin elastomer, based on the weight of the syndiotactic polypropylene, olefin elastomer and styrene-butadiene-styrene copolymer.

DETAILED DESCRIPTION OF THE INVENTION

The blend compositions of the present invention generally include a syndiotactic polypropylene, olefin elastomer, and a block copolymer.

The olefin elastomer utilized in the practice of the present invention is generally a copolymer of an ethylene and a higher order olefin having from about 3 to about 12 carbon atoms. Preferably, the olefin elastomer utilized in the practice of the present invention is a copolymer of an ethylene and a higher order olefin having from about 3 to about 8 carbon atoms, and most preferably from about 3 to about 6 carbon atoms. A suitable example of an olefin elastomer which may be utilized in the present invention includes an ethylene-octene copolymer. Such olefin elastomers will typically comprise more ethylene than higher order olefin. Generally, such polymers will comprise in the range of about 1 to about 40 mol percent higher order olefin, preferably in the range of about 5 to about 30 higher order olefin, and most preferably in the range of about 15 to about 25 mol percent higher order olefin.

As used herein, "elastomer" is defined by ASTM D883, and is a material which at room temperature can be stretched repeatedly to at least twice its original length and, upon immediate release of the stress, will return, with force, to its approximate original length.

The olefin elastomers utilized in the present invention can be made by any suitable method, including polymerization utilizing traditional Zieger catalysts, or with metallocene catalysts.

The syndiotactic polypropylene utilized in the blends of the present invention, and methods of making such a syndiotactic polypropylene, are well known to those of skill in the polyolefin art. An example of a suitable syndiotactic polypropylene and a method of its making can be found in U.S. Pat. Nos. 5,334,677 and 5,476,914, both herein incorporated by reference.

Preferably, the syndiotactic polypropylene utilized in the present invention comprises at least 10 percent syndiotactic molecules. More preferably, the syndiotactic polypropylene utilized in the present invention comprises at least 50 percent syndiotactic molecules, even more preferably at least 80 percent syndiotactic molecules, and still more preferably at least about 83 percent syndiotactic molecules. Most preferably the syndiotactic polypropylene utilized in the present invention comprises substantially syndiotactic molecules.

The still more preferred syndiotactic polypropylenes utilized in the present invention generally comprise in the range of about 83 to about 95 percent syndiotactic molecules, more preferably in the range of about 85 to about 95 percent syndiotactic molecules, and most preferably in the range of about 89 to about 95 percent syndiotactic molecules.

The syndiotactic polypropylene useful in the present invention will generally be selected according to the desired end use of the blend, for compatibility with the block copolymer, and for compatibility with the blending and processing conditions. The molecular weight upper range for the syndiotactic polypropylene is generally dictated by the desired handling compatibility. The lower range is generally dictated by the desired end use of the blend.

As a non-limiting example, a suitable syndiotactic polypropylene which may be utilized in the present invention will have a molecular weight in the range of about 127,000 to about 156,000, a melting point in the range of about 126° C. to about 132° C., a bulk density in the range of about 0.36 to about 0.42 $g/cc^3$, a polydispersity in the range of about 2 to about 5, and a percent racemic dyad and pentad greater than about 70 percent.

The block copolymer utilized in the present invention includes ABA type copolymers of alkenylaromatic and diene components, especially those comprising styrene and butadiene or isoprene blocks. The conjugated diene blocks may be partially or entirely hydrogenated, whereupon they may be represented as ethylene-propylene blocks or the like and have properties similar to those of olefin block copolymers. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(α-methyl-styrene)-polybutadiene-poly(α-methyl-styrene), and poly(α-methyl-styrene)-polysioprene-poly(α-methyl-styrene).

The preferred block copolymer utilized in the present invention is selected from the group consisting of polystyrene-polybutadiene-polystyrene (SBS), hydrogenated polystyrene-polybutadiene-polystyrene (SEBS), polystyrene-polyisoprene-polystyrene (SIS). The most preferred block copolymer utilized in the present invention is polystyrene-polybutadiene-polystyrene (SBS).

It is generally believed that any relative amounts of syndiotactic polypropylene, and olefin elastomer and block copolymer may be utilized in the present invention. The relative amounts of syndiotactic polypropylene, olefin elastomer and block copolymer utilized in the blends of present invention will generally depend upon the ultimate end use of the blend. Generally, the blends of the present invention will comprise in the range of about 1 to about 99 weight percent syndiotactic polypropylene, and in the range of about 99 to about 1 weight percent block copolymer and olefin elastomer, based on the weight of syndiotactic polypropylene, olefin elastomer and block copolymer. Preferable, the blends of the present invention will comprise in the range of about 10 to about 90 weight percent syndiotactic polypropylene, and in the range of about 90 to about 10 weight percent block copolymer and olefin elastomer, based on the weight of syndiotactic polypropylene, olefin elastomer and block copolymer. More preferably, the blends of the present invention will comprise in the range of about 25 to about 75 weight percent syndiotactic polypropylene, and in the range of about 75 to about 25 weight percent block copolymer and olefin elastomer, based on the weight of syndiotactic polypropylene, olefin elastomer and block copolymer, and most preferably in the range of about 45 to about 55 weight percent syndiotactic polypropylene, and in the range of about 55 to about 45 weight percent block copolymer and olefin elastomer, based on the weight of syndiotactic polypropylene, olefin elastomer and block copolymer.

The blend compositions of the present invention may also contain conventional ingredients as are known to those of skill in the art. Non-limiting examples of such conventional ingredients include antiblocking agents, antistatic agents, antioxidants, blowing agents, crystallization aids, dyes, flame retardants, fillers, impact modifiers, mold release agents, oils, other polymers, pigments, processing agents, reinforcing agents, stabilizers, UV resistance agents, and the like.

Non-limiting examples of reinforcing agents include inorganic or organic products of high molecular weight, including glass fiber, asbestos, boron fibers, carbon and graphite fibers, whiskers, quartz and silica fibers, and synthetic organic fibers.

When such conventional ingredients are utilized, they will generally be present in a range from about 0.01 to about 50 weight percent of the blend, preferably in a range from about 1 to about 25 weight percent of the blend.

The blends of the present invention are generally made by contacting the syndiotactic polypropylene, olefin elastomer and block copolymer together at a temperature that is above the melting point of the syndiotactic polypropylene and olefin elastomer, and below the point at which any substantial degradation occurs to the polymers. The mixture can then be directly shaped into useful articles, or may be pelletized for later use.

Apparatus suitable for blending the present invention includes a Henschel blender or a Banbury mixer.

With a Henschel blender, the block copolymer is first placed in the blender at high speed, heated to about 120° F. to about 130° F., with oil slowly added during the heating. Once the oil has absorbed by the block copolymer and olefin elastomer, the syndiotactic polypropylene is added to the blender. The resulting dry blend is then extruded into pellets or other desired shape.

With a Banbury mixer, the block copolymer is added with the mixer rotating at low speed. After the addition of the block copolymer and olefin elastomer, the mixer speed is increased and the syndiotactic polypropylene then added. The resulting dry blend is then extruded into pellets or other desired shape.

The blends of the present invention are particularly suitable for use in mechanical rubber goods ("MRG") applications, and for use in gasket applications.

The blends of the present invention may be shaped into final products by any of the known thermoplastic forming techniques. Non-limiting examples of suitable techniques include injection molding, extruding, pultruding, thermoforming, vacuum molding, stamping, forging, solid phase forming, rotary molding, and the like. The conditions for the various thermoplastic forming techniques, such as pressure, residence time, type of machinery, and the like, may be determined by one skilled in the art of forming thermoplastics.

EXAMPLES

The following examples are provided to illustrate the present invention, and should not be taken as limiting the claimed invention in any way.

In the examples, the physical properties were determined in the following manner:

Melt Flow

The melt flow was determined by ASTM D-1238.

300% Modulus

The 300% Modulus was determined by ASTM D-638.

Tensile Modulus

The Tensile Modulus was determined by ASTM D-638.

Tensile Strength

The Tensile Strength flow was determined by ASTM D-638.

Elongation

The Elongation was determined by ASTM D-638.

Shore A Hardness

The melt flow was determined by ASTM D-2240.

Compression Set

The Compression Set was determined by ASTM D-395.

Ozone Resistance

The Ozone Resistance was determined by ASTM D-518.

Hunter Color

The Hunter Color was determined by ASTM D-1925.

Yellowness Index

The Yellowness Index was determined by ASTM D-1925.

Example 1

In this Example:

FINAPRENE 414 is styrene-butadiene-styrene (40 wt % styrene, 60 wt % butadiene), with molecular weight of 110,000 and density of 0.96, available from Fina Chemical Company;

ENGAGE 8100 is an ethylene-octene copolymer available from Dow Chemical, made from a metallocene catalyzed process, and having a melt flow of 1.0, a specific gravity of 0.87, and comprising 24 mol percent octene;

ENGAGE 8150 is an ethylene-octene copolymer available from Dow Chemical, made from a metallocene catalyzed process, and having a melt flow of 0.5, a specific gravity of 0.868, and comprising 25 mol percent octene;

FINA 7622 is a crystalline isotactic polypropylene with a molecular weight of 210,000 and generally having 2.5 to 3.6 mol % ethylene, available from Fina Chemical Company;

FLEXON 766 is a napthenic petroleum oil available from Exxon Chemical Company;

ELVAX 265 is polyvinyl acetate available from DuPont;

FINA 525 is a general purpose polystyrene available from Fina Chemical Company;

WHITING is calcium carbonate;

This example is a control, and investigates the physical properties of extrusion mixtures of ethylene-octene elastomer, styrene-butadiene-styrene (SBS) and crystalline polypropylene (PP) for various levels.

Each formulation was prepared by introducing the state amounts of ingredients into a laboratory-sized Banbury as follows. With the Banbury operating at low speed of 50 rpm, all ingredients except the Flexxon, Elvax and whiting, were added. The mixer speed was then increased to 1300 rpm. Once the material in the mixer fluxes, the Elvax is then added. After the Elvax is dispursed in the mixer, the Flexxon oil is added, ⅓ at a time. Once the Flexxon oil has been added, the whiting in then added. The mixture is then compression molded into an 8 inch by 10 inch plaque with a 60 mils thickness.

From this plaque, flex bars and tensile bars were stamped.

The stamped shapes were then subjected to testing, with results presented in following Table 1.

ENGAGE 8100 is an ethylene-octene copolymer available from Dow Chemical, made from a metallocene catalyzed process, and having a melt flow of 1.0, a specific gravity of 0.87, and comprising 24 mol percent octene;

ENGAGE 8150 is an ethylene-octene copolymer available from Dow Chemical, made from a metallocene catalyzed process, and having a melt flow of 0.5, a specific gravity of 0.868, and comprising 25 mol percent octene;

FINA 7622 is a crystalline isotactic polypropylene with a molecular weight of 210,000 and generally having 2.5 to 3.6 mol % ethylene, available from Fina Chemical Company;

sPP is a syndiotactic polypropylene having a melt flow of 8.9, a molecular weight of 134,000, and having a percent racemic dyad value of 92.3%, and a polydispersity of about 2.5;

FLEXON 766 is a napthenic petroleum oil available from Exxon Chemical Company;

ELVAX 265 is polyvinyl acetate available from DuPont;

FINA 525 is a general purpose polystyrene available from Fina Chemical Company;

WHITING is calcium carbonate;

This example is an illustration of one embodiment of the present invention of formulation that are useful in mechanical rubber goods (MRG) applications, and investigates the

TABLE 1

| | (SBS3/PP) | | | | | |
|---|---|---|---|---|---|---|
| | 1 (wt %) | 2 (wt %) | 3 (wt %) | 4 (wt %) | 5 (wt %) | 6 (wt %) |
| FINAPRENE 417 (SBS) | 20 | 20 | 15 | 15 | 15 | 15 |
| FINAPRENE 414 (SBS) | 15 | 15 | 15 | 15 | 15 | 15 |
| ENGAGE 8100 | 0 | 0 | 10 | 0 | 15 | 0 |
| ENGAGE 8150 | 0 | 0 | 0 | 10 | 0 | 15 |
| FINA 7622 (PP) | 0 | 15 | 15 | 15 | 15 | 15 |
| FLEXON 766 | 20 | 20 | 20 | 20 | 20 | 20 |
| ELVAX 265 | 15 | 15 | 10 | 10 | 5 | 5 |
| FINA 525 | 15 | 0 | 0 | 0 | 0 | 0 |
| WHITING | 15 | 15 | 15 | 15 | 15 | 15 |
| PHYSICAL PROPERTIES | | | | | | |
| Melt Flow, 200 C @ 5 kg, g/10 min. | 103.6 | 97.2 | 72 | 71.2 | 59.2 | 54 |
| 300% Modulus, psi | 356 | 327 | 443 | 443 | 397 | 397 |
| Tensile Modulus, psi | 685 | 2190 | 2845 | 2790 | 2230 | 2195 |
| Tensile Strength, psi | 550 | 350 | 450 | 500 | 400 | 450 |
| Elongation, % | 540 | 440 | 540 | 520 | 520 | 680 |
| Shore A Hardness | 60 | 70 | 74 | 72 | 72 | 72 |
| Tear, lb/in | 96.4 | 121.4 | 152.9 | 159.7 | 158.6 | 153.4 |

Example 2

Mechanical Rubber Goods Applications

In this Example:

FINAPRENE 414 is styrene-butadiene-styrene (40 wt % styrene, 60 wt % butadiene), with molecular weight of 110,000 and density of 0.96, available from Fina Chemical Company;

FINAPRENE 417 is styrene-butadiene-styrene (29 wt % styrene, 71 wt % butadiene), with molecular weight of 115,000 and density of 0.94, available from Fina Chemical Company;

physical properties of extrusion mixtures of styrene-butadiene-styrene (SBS), ethylene-octene elastomers, and syndiotactic polypropylene (sPP) for various levels. The formulations utilized in this Example 2 are identical to those of Example 1, with the exception that syndiotactic polypropylene has been substituted for the crystalline polypropylene.

As in Example 1, each formulation was prepared by introducing the stated amounts of ingredients into a laboratory-sized Banbury, forming a plaque and forming test bars from the plaque.

The bars were then subjected to testing, with results presented in following Table 2.

TABLE 2

(SBS/sPP - MRG Applications)

|  | 1 (wt %) | 2 (wt %) | 3 (wt %) | 4 (wt %) | 5 (wt %) | 6 (wt %) |
|---|---|---|---|---|---|---|
| FINAPRENE 417 (SBS) | 20 | 20 | 15 | 15 | 15 | 15 |
| FINAPRENE 414 (SBS) | 15 | 15 | 15 | 15 | 15 | 15 |
| ENGAGE 8100 | 0 | 0 | 10 | 0 | 15 | 0 |
| ENGAGE 8150 | 0 | 0 | 0 | 10 | 0 | 15 |
| sPP | 0 | 15 | 15 | 15 | 15 | 15 |
| FLEXON 766 | 20 | 20 | 20 | 20 | 20 | 20 |
| ELVAX 265 | 15 | 15 | 10 | 10 | 5 | 5 |
| FINA 525 | 15 | 0 | 0 | 0 | 0 | 0 |
| WHITING | 15 | 15 | 15 | 15 | 15 | 15 |
| PHYSICAL PROPERTIES |  |  |  |  |  |  |
| Melt Flow, 200 C @ 5 kg, g/10 min. | 119.6 | 49.2 | 22.4 | 10 | 30.8 | 9.2 |
| 300% Modulus, psi | 367 | 397 | 335 | 415 | 410 | 399 |
| Tensile Modulus, psi | 660 | 2820 | 2100 | 3130 | 2985 | 3270 |
| Tensile Strength, psi | 500 | 500 | 350 | 500 | 500 | 550 |
| Elongation, % | 480 | 780 | 610 | 635 | 750 | 1000 |
| Shore A Hardness | 60 | 70 | 73 | 75 | 74 | 75 |
| Tear Strength, lb/in | 90.9 | 134.2 | 164.4 | 174 | 170.5 | 175.3 |

Example 3

Medium Flow MRG Applications

In this Example:

FINAPRENE 411 is styrene-butadiene-styrene (31 wt % styrene, 69 wt % butadiene), with molecular weight of 280,000 and density of 0.94, available from Fina Chemical Company.

FINAPRENE 414 is styrene-butadiene-styrene (40 wt % styrene, 60 wt % butadiene), with molecular weight of 110,000 and density of 0.96, available from Fina Chemical Company;

ENGAGE 8100 is an ethylene-octene copolymer available from Dow Chemical, made from a metallocene catalyzed process, and having a melt flow of 1.0, a specific gravity of 0.87, and comprising 24 mol percent octene;

ENGAGE 8150 is an ethylene-octene copolymer available from Dow Chemical, made from a metallocene catalyzed process, and having a melt flow of 0.5, a specific gravity of 0.868, and comprising 25 mol percent octene;

sPP is a syndiotactic polypropylene having a melt flow of 8.9, a molecular weight of 134,000, and having a percent racemic dyad value of 92.3%, and a polydispersity of about 2.5;

FLEXON 766 is a napthenic petroleum oil available from Exxon Chemical Company;

ELVAX 265 is polyvinyl acetate available from DuPont;

FINA 525 is a general purpose polystyrene available from Fina Chemical Company;

WHITING is calcium carbonate;

This example is an illustration of one embodiment of the present invention of formulation that are useful in medium flow mechanical rubber goods (MRG) applications, and investigates the physical properties of extrusion mixtures of styrene-butadiene-styrene (SBS), ethylene-octene elastomers and syndiotactic polypropylene (sPP) for various levels.

As in Example 1, each formulation was prepared by introducing the stated amounts of ingredients into a laboratory-sized Banbury, forming a plaque and forming test bars from the plaque.

The bars were then subjected to testing, with results presented in following Table 3.

TABLE 3

(SBS/sPP - Medium Flow MRG Applications)

|  | 1 (wt %) | 2 (wt %) | 3 (wt %) | 4 (wt %) | 5 (wt %) | 6 (wt %) |
|---|---|---|---|---|---|---|
| FINAPRENE 411 (SBS) | 20 | 20 | 15 | 15 | 15 | 15 |
| FINAPRENE 414 (SBS) | 15 | 15 | 15 | 15 | 15 | 15 |
| ENGAGE 8100 | 0 | 0 | 10 | 0 | 15 | 0 |
| ENGAGE 8150 | 0 | 0 | 0 | 10 | 0 | 15 |
| sPP | 0 | 15 | 15 | 15 | 15 | 15 |
| FLEXON 766 | 20 | 20 | 20 | 20 | 20 | 20 |
| ELVAX 265 | 15 | 15 | 10 | 10 | 5 | 5 |
| FINA 525 | 15 | 0 | 0 | 0 | 0 | 0 |
| WHITING | 15 | 15 | 15 | 15 | 15 | 15 |
| PHYSICAL PROPERTIES |  |  |  |  |  |  |
| Melt Flow, 200 C @ 5 kg, g/10 min. | 119.6 | 49.2 | 22.4 | 10 | 30.8 | 9.2 |
| 300% Modulus, psi | 367 | 397 | 335 | 415 | 410 | 399 |
| Tensile Modulus, psi | 660 | 2820 | 2100 | 3130 | 2985 | 3270 |

TABLE 3-continued (SBS/sPP - Medium Flow MRG Applications)

|  | 1 (wt %) | 2 (wt %) | 3 (wt %) | 4 (wt %) | 5 (wt %) | 6 (wt %) |
| --- | --- | --- | --- | --- | --- | --- |
| Tensile Strength, psi | 500 | 500 | 350 | 500 | 500 | 550 |
| Elongation, % | 480 | 780 | 610 | 635 | 750 | 1000 |
| Shore A Hardness | 60 | 70 | 73 | 75 | 74 | 75 |
| Tear, lb/in | 90.9 | 134.2 | 164.4 | 174 | 170.5 | 175.3 |

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

What is claimed is:

1. A composition comprising about 1 to about 99 weight percent syndiotactic polypropylene, and about 99 to about 1 weight percent of a block copolymer and olefin elastomer, based on the weight of the syndiotactic polypropylene and block copolymer and olefin elastomer,
    wherein the block copolymer comprises polystyrene-polybutadiene-polystyrene, and the olefin elastomer comprises ethylene-octene copolymer.

2. A composition comprising about 10 to about 90 weight percent syndiotactic polypropylene, and about 90 to about 10 weight percent of a block copolymer and olefin elastomer, based on the weight of the syndiotactic polypropylene, olefin elastomer and block copolymer, wherein the syndiotactic polypropylene comprises a percent racemic dyad value greater than 70 percent, wherein the block copolymer comprises polystyrene-polybutadiene-polystyrene, and the olefin elastomer comprises ethylene-octene copolymer.

3. A composition comprising about 25 to about 75 weight percent syndiotactic polypropylene, and about 75 to about 25 weight percent of a block copolymer and olefin elastomer, based on the weight of the syndiotactic polypropylene, olefin elastomer and block copolymer, wherein the syndiotactic polypropylene comprises a percent racemic dyad value greater than 70 percent and wherein the block copolymer comprises polystyrene-polybutadiene-polystyrene, and the olefin elastomer comprises ethylene-octene copolymer.

4. A method of making a polymer blend comprising contacting together in the range of about 1 to about 99 weight percent syndiotactic polypropylene, and in the range of about 99 to about 1 weight percent block copolymer and olefin elastomer, based on the weight of the syndiotactic polypropylene, olefin elastomer and block copolymer, at a temperature that is above the melting point of the syndiotactic polypropylene and olefin elastomer, but below the point at which any substantial degradation of the syndiotactic polypropylene, olefin elastomer or block copolymer occurs,
    wherein the block copolymer comprises polystyrene-polybutadiene-polystyrene, and the olefin elastomer comprises ethylene-octene copolymer.

5. A method of making a polymer blend comprising contacting together in the range of about 10 to about 90 weight percent syndiotactic polypropylene, and about 90 to about 10 weight percent of a block copolymer and olefin elastomer, based on the weight of the syndiotactic polypropylene, olefin elastomer and block copolymer, at a temperature that is above the melting point of the syndiotactic polypropylene and olefin elastomer, but below the point at which any substantial degradation of the syndiotactic polypropylene, olefin elastomer or block copolymer occurs, wherein the syndiotactic polypropylene comprises a percent racemic dyad value greater than 70 percent, and wherein the block copolymer comprises polystyrene-polybutadiene-polystyrene, and the olefin elastomer comprises ethylene-octene copolymer.

6. A method of forming an article comprising:
    (a) contacting together in the range of about 1 to about 99 weight percent syndiotactic polypropylene, and in the range of about 99 to about 1 weight percent block copolymer and olefin elastomer, based on the weight of the syndiotactic polypropylene, olefin elastomer and block copolymer, at a temperature that is above the melting point of the syndiotactic polypropylene, but below the point at which any substantial degradation of either the syndiotactic polypropylene or block copolymer occurs, to form a mixture, wherein the block copolymer comprises polystyrene-polybutadiene-polystyrene, and the olefin elastomer comprises an ethylene-octene copolymer,
    (b) heating the mixture above the melting point of the syndiotactic polypropylene and olefin elastomer to form a heated mixture;
    (c) forming the heated mixture into a desired shape;
    (d) cooling the desired shape to below the melting point of the syndiotactic polypropylene and olefin elastomer.

7. A method of forming an article comprising:
    (a) contacting together in the range of about 10 to about 90 weight percent syndiotactic polypropylene, and about 90 to about 10 weight percent of a block copolymer and olefin elastomer, based on the weight of the syndiotactic polypropylene, olefin elastomer and block copolymer, at a temperature that is above the melting point of the syndiotactic polypropylene, but below the point at which any substantial degradation of either the syndiotactic polypropylene or block copolymer occurs, to form a mixture, wherein the syndiotactic polypropylene comprises a percent racemic dyad value greater than 70 percent, wherein the block copolymer comprises polystyrene-polybutadiene-polystyrene, and the olefin elastomer comprises an ethylene-octene copolymer;
    (b) heating the mixture above the melting point of the syndiotactic polypropylene and olefin elastomer to form a heated mixture;
    (c) forming the heated mixture into a desired shape;
    (d) cooling the desired shape to below the melting point of the syndiotactic polypropylene and olefin elastomer.

* * * * *